(12) United States Patent
Stecher

(10) Patent No.: US 11,732,687 B2
(45) Date of Patent: Aug. 22, 2023

(54) MANUFACTURING OF A WIND TURBINE ROTOR BLADE

(71) Applicant: Siemens Gamesa Renewable Energy A/S, Brande (DK)

(72) Inventor: Harald Stecher, Skørping (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 79 days.

(21) Appl. No.: 17/378,750

(22) Filed: Jul. 18, 2021

(65) Prior Publication Data
US 2022/0025848 A1 Jan. 27, 2022

(30) Foreign Application Priority Data

Jul. 27, 2020 (EP) .................................. 20187857

(51) Int. Cl.
*B29C 70/36* (2006.01)
*B29C 70/44* (2006.01)
(Continued)

(52) U.S. Cl.
CPC ............ *F03D 1/0675* (2013.01); *B29C 70/36* (2013.01); *B29C 70/443* (2013.01);
(Continued)

(58) Field of Classification Search
CPC .. B29C 70/36; B29C 70/443; B29L 2031/085
See application file for complete search history.

(56) References Cited

U.S. PATENT DOCUMENTS 3,651,861 A * 3/1972 Deuring .................. B29C 33/02
425/84
6,270,603 B1 * 8/2001 Westerman ............. B29C 65/02
156/323
(Continued)

FOREIGN PATENT DOCUMENTS

EP 1 310 351 A1 5/2003
EP 2 897 791 A2 7/2015
(Continued)

OTHER PUBLICATIONS

Machine translation of FR 3015919 A1 dated Jul. 2015. (Year: 2015).*
(Continued)

*Primary Examiner* — Robert B Davis
(74) *Attorney, Agent, or Firm* — Schmeiser, Olsen & Watts LLP

(57) ABSTRACT

Provided is a method of manufacturing a rotor blade of a wind turbine, the method including: placing fiber material on a shape forming surface; arranging phase change material being in a first state at at least one predetermined first region and/or arranging phase change material being in a second state at at least one predetermined second region; soaking the fiber material with resin to be in thermal contact with the phase change material at the first region and/or second region; during a crosslinking reaction for crosslinking the resin: absorbing heat generated within the resin by the phase change material at the first region; and/or releasing heat from the phase change material toward the resin at the second region.

15 Claims, 3 Drawing Sheets

Figure 1:
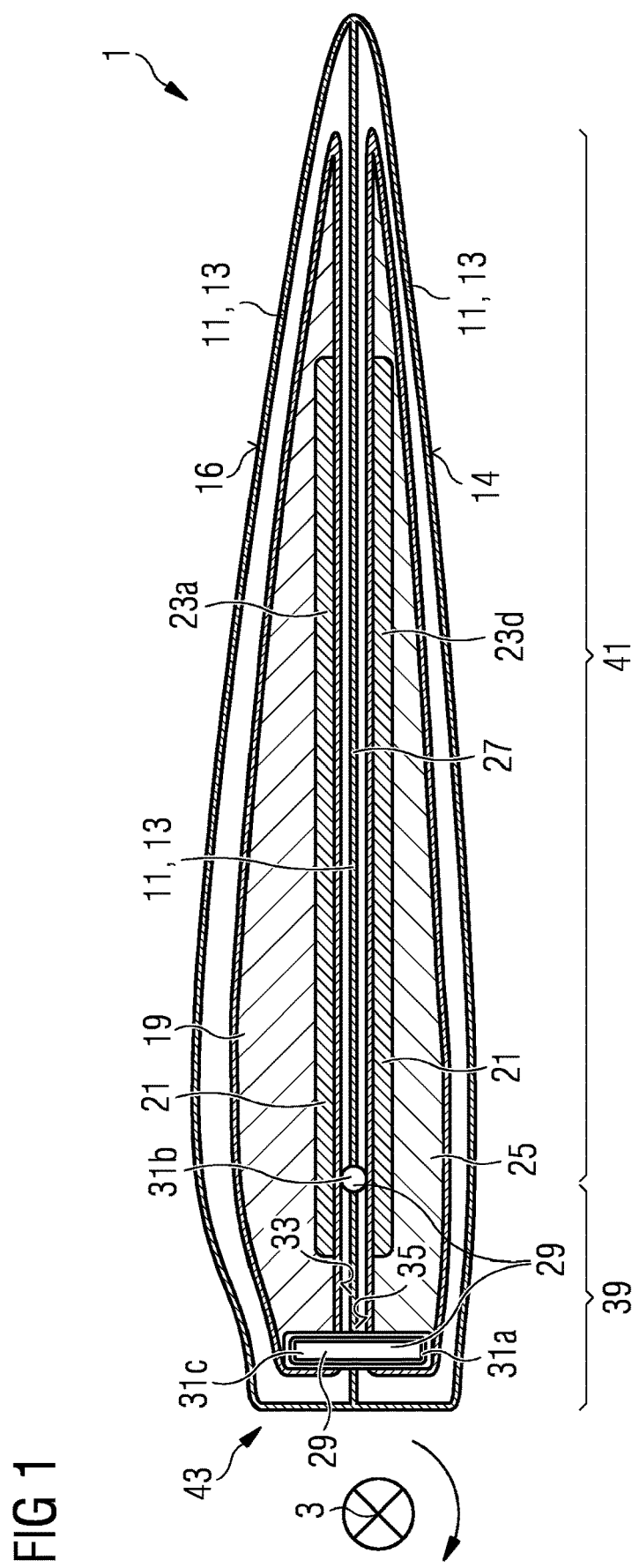

(51) Int. Cl.
  *F03D 1/06*     (2006.01)
  *B29L 31/08*    (2006.01)
(52) U.S. Cl.
  CPC . *B29L 2031/085* (2013.01); *F05B 2280/6003* (2013.01); *F05B 2280/6014* (2013.01); *F05B 2280/6015* (2013.01)

(56) References Cited

U.S. PATENT DOCUMENTS

| | | |
|---|---|---|
| 8,919,754 B2 | 12/2014 | Schibsbye |
| 2010/0140842 A1 * | 6/2010 | Nelson ................ B29C 35/0288 264/327 |
| 2011/0274553 A1 | 11/2011 | Stiesdal |
| 2012/0135099 A1 | 5/2012 | Dean et al. |
| 2015/0231844 A1 | 8/2015 | Kamke et al. |
| 2017/0165923 A1 * | 6/2017 | Chen ....................... B29C 70/54 |

FOREIGN PATENT DOCUMENTS

| | | | |
|---|---|---|---|
| EP | 3078471 A1 | 10/2016 | |
| FR | 3015919 A1 * | 7/2015 | ............. B29C 33/04 |
| WO | WO 03/000623 A1 | 1/2003 | |
| WO | WO 2014/044445 A2 | 3/2014 | |

OTHER PUBLICATIONS

European Search Report and Written Opinion of the European Searching Authority dated Jan. 22, 2021 for Application No. 20187857.6.

\* cited by examiner

MANUFACTURING OF A WIND TURBINE ROTOR BLADE

CROSS-REFERENCE TO RELATED APPLICATIONS

This application claims priority to European Application No. 20187857.6, having a filing date of Jul. 27, 2020, the entire contents of which are hereby incorporated by reference.

FIELD OF TECHNOLOGY

The following relates to a method of manufacturing a rotor blade of a wind turbine.

BACKGROUND

A conventional wind turbine comprises a wind turbine tower, a nacelle mounted on top of the tower, wherein a rotor is rotatably supported within the nacelle, at which rotor plural rotor blades are mounted. Upon rotation of the rotor, a coupled generator produces electrical energy to be supplied to a utility grid.

The rotor blades used for conventional turbines may have a considerable length between for example 30 m and 100 m. Conventionally, rotor blades have been manufactured by crosslinking resin which embeds fiber material. During or for initiating a crosslinking reaction of resin material, heating is applied. For the integral blade manufacturing method, heating is only possible from the outside. The heating necessary for curing (i.e., crosslinking the resin) in the inside is mainly created by exothermic heat from the curing reaction.

Both overheating in resin rich areas and thick laminates as well as underheating where premanufactured parts and infused laminates come in contact can give problems in the completed rotor blade. In particular, too low heat during crosslinking reaction may lead to locally low (incomplete) crosslinking degree of the resin which may require a post-curing step afterwards. Overheating on the other hand can damage the auxiliary equipment and may in the worst case give rise to burns on the blade and may start fire in the auxiliary equipment, such as a mandrel.

Mandrels and their use in casting of blades have been described in EP 1 310 351, US 2011/0274553, U.S. Pat. No. 8,919,754 and for example EP 2 897 791.

The document WO 03/000623 A1 discloses a method and apparatus for casting molten materials using phase change material. Therein, the phase change material is heated above its melting point, the mould is filled with a mould material with excess material retained in the funnel means. The latent heat of fusion of the phase change material heats the funnel means as the phase change material changes from a liquid to a solid and prevents the material in the funnel means from solidifying as the material within the mould solidifies and contracts, thereby allowing the material in the funnel means to feed into the mould and fill any voids created by the contraction of the solidified material.

Conventionally, heat management during manufacturing of a wind turbine blade has been performed by changing the lay-up of reinforcements or helping materials. Resin rich areas are typically avoided in the design to avoid overheating. Thin sections which tend to undercure are covered by additional layers of glass or a helper material to increase the layer thickness and create more exothermic heat. If this is not possible, the curing time has to be extended or the blade must be post cured locally with heating blankets or as a whole in an oven.

Thus, conventional manufacturing methods are cumbersome and complex and lead to a design of the resin material taking into account the amount of heat generated during the curing reaction. However, thereby, stability issues of the rotor blade may not optimally be accounted for.

Thus, there may be a need for a method of manufacturing a rotor blade of a wind turbine, wherein the method is simplified, requires less time and can ensure a desired stability of the manufactured rotor blade. Furthermore, auxiliary equipment used during the manufacturing may not be damaged during the manufacturing so that auxiliary equipment may be reused for manufacturing further rotor blades.

SUMMARY

An aspect relates to a method of manufacturing a rotor blade of a wind turbine, the method comprising: placing fiber material on a shape forming surface (e.g., provided by a mold); arranging phase change material (also referred to as PCM) being in a first state at at least one predetermined first region (in particular in thermal contact with the fiber material) and/or arranging phase change material being in a second state at at least one predetermined second region (in particular in thermal contact with the fiber material); embedding/soaking the fiber material with resin to be in thermal contact with the phase change material at the first and/or second region; during a crosslinking reaction for crosslinking the resin: absorbing heat generated within the resin by the phase change material at the first region; and/or releasing heat from the phase change material toward the resin at the second region.

The method may partly be performed manually and partly be performed automatically after initiation of a crosslinking reaction. The fiber material may for example comprise glass fiber material and/or carbon fiber material or any other type of fiber material. The fiber material is later on soaked or embedded with the resin which may be in a fluid state before initiating or completing the crosslinking reaction. When totally cured, after completion of the crosslinking reaction, the fiber material may be firmly connected with the solidified resin which has been crosslinked. Thereby, the fiber material acts as an enforcement for providing a rigid and strong rotor blade surface.

Placing the fiber material on the shape forming surface may for example be performed partly manually. Thereby, the fiber material may be provided in plural pieces, such as mats or webs having for example a size between 30×50 cm to for example 1 m×3 m. The shape forming surface may for example be complementary in shape to a pressure surface or a suction surface of the rotor blade to be manufactured. The shape forming surface may substantially completely be covered with the fiber material, in particular such that the fiber material substantially evenly covers the shape forming surface such that the thickness of the fiber material is substantially constant across the shape forming surface. In other embodiments, the thickness or amount of fiber material which is placed on a particular area of the shape forming surface may vary depending on the requirement of strength as intended in different areas of the wind turbine blade. The phase change material may comprise a material which can be present in at least two states, namely the first state and the second state. A transition from the first state to the second state may for example occur when heat is supplied to the phase change material being in the first state. A transition of the phase change material from the second state to the first state may for example occur when heat is released from the phase change material being in the second state. The phase change material may comprise one or more further states. For example, the transition from the first state to the second state or from the second state to the first state may or may not comprise transitions between one or more further intermediate states. The phase change material in the first state and/or the second state may be a liquid or a solid state. In order to set the phase change material into the first state or the second state a respective preparation step may also be performed wherein the phase change material is heated or cooled, in order to set the phase change material into the first state or the second state.

The phase change material may be arranged in the first state at the at least one predetermined first region or at the at least one predetermined second region in the second state, by directly putting the phase change material in the respective state onto the fiber material (or onto a plastic sheet covering the fiber material) which has been placed on the shape forming surface. In other embodiments, the phase change material (in the first state or the second state) may be attached to an auxiliary equipment, in particular a filling body or mandrel which may as a whole is placed onto the fiber material on the shape forming surface. Thereby the filling body or filling bodies may be covered by a plastic sheet.

The predetermined first region and the predetermined second region may have been determined based on analysis or simulation or estimation of thermal behaviour of the entire system including the resin, the fiber material and additional potential reinforcement structures within the rotor blade during the crosslinking reaction. For example, the predetermined first region may be a region where a relatively thick layer or a high amount of resin is present, while the at least one predetermined second region may be a region, where relatively low amount of resin is present or where the resin has a relative small thickness or is in contact with other structures not taking part in the crosslinking reaction. Arranging the phase change material which is in the first state at the at least one predetermined first region and arranging the phase change material which is in the second state at at least one predetermined second region may for example be performed in a single step, wherein a filling body and potentially also another filling body at which the phase change material in the first state has been mounted at particular areas and at which the phase change material in the second state has been mounted at other areas is placed onto the fiber material on the shape forming surface.

The resin may for example comprise an epoxy resin or an acrylic resin or any other type of resin which is capable to undergo a crosslinking reaction in which molecules within the resin crosslink with each other to form covalent bonds or other bonds. The fiber material may be soaked with the resin when the resin is in a liquid state. After crosslinking or curing the resin, the resin will be in a solid state embedding or surrounding the fiber material. When the phase change material at the first region and/or the second region is in contact with the resin, the phase change material at the first region may absorb the heat which is generated within the resin at the first region and may release heat to the resin at the second region. The fiber material and/or the resin is not necessarily in direct physical contact with the phase change material, is however in thermal contact with the phase change material. For example, a plastic foil or sheet may be between the phase change material and the resin/the fiber material. Thereby, vacuum assisted manufacturing (e.g., Vacuum Assisted Resin Transfer Molding (VARTM)) is supported in which the resin is introduced into a sealed mould (in particular formed by the shape forming surface and another shape forming surface) and is sucked by a vacuum to soak all fiber material which is arranged within the sealed mould. The resin may for example be introduced from a section eventually forming the root of the rotor blade and may be sucked towards a tip end of the rotor blade. In other embodiments, several entry ports may be provided for introducing the resin into the sealed mould body and one or more sucking ports are provided for having the resin flowing through the sealed mould and thereby soaking essentially the entire fiber material placed within the sealed mould.

By having the phase change material arranged and being in the first state at the predetermined first region, advantageously heat is absorbed which is generated within the resin. Thereby, overheating may be avoided. When the phase change material in the second state is arranged at the predetermined second region, advantageously heat may be released from the phase change material to the resin in order to accelerate the crosslinking reaction compared to the situation, where the phase change material in the second state was not present.

According to an embodiment of the present invention, the first state allows absorbing heat (e.g., transitioning to the second state) and comprises a solid phase, in particular crystalline phase, or a first crystal phase of the phase change material, wherein the second state allows releasing heat (e.g., transitioning to the first state) and comprises a liquid phase or a second crystal phase of the phase change material.

The phase change material may have a melting temperature between 50° C. and 100° C., in particular between 60° C. and 80° C., in particular around substantially 70° C. The phase change material may comprise organic (carbon-containing) materials, for example derived from either petroleum, from plants or from animals. The phase change material may comprise hydrocarbons, primarily paraffins and/or lipids, but also one or more sugar alcohols. For example, the paraffin may comprise 31 carbons, the paraffin may comprise 32 carbons or the paraffin may comprise 33 carbons which may have melting temperatures between 60° C. and 80° C. The phase change material may for example also comprise stearic acid, acrylic acid, dinitrotoluene, phenylacetic acid or a combination of the afore mentioned materials. The phase change material may comprise inorganic materials, such as salt hydrates which may generally either use natural salts from the sea or from mineral deposits or are pre-by-products of other processes. A third class of the phase change material which may be employed is a solid to solid phase change material, for example $Na_2SiO_3*5H_2O$ having a melting temperature of 72° C. The phase change material may comprise one or more organic components and one or more inorganic components, in particular paraffins and/or inorganic salts and/or sodium acetate. The material may be provided in plural pockets or pouches, for example plastic pouches. Thereby, the method may be performed using conventionally available materials. When the melting temperature is between for example 60° C. and 80° C., the curing reaction or crosslinking reaction desired for forming the rotor blade may advantageously be supported.

According to an embodiment of the present invention, the shape forming surface is provided by a first mould and defines a shape of a suction side or a pressure side of the rotor blade.

The first mould may comprise the shape forming surface being substantially complementary to the suction side of the pressure side of the rotor blade remanufactured. A second mould having another shape forming surface may further be utilized in order to define the pressure side or the suction side of the rotor blade. The second mould may be placed onto an (circumferencial) edge of the first mould such that the first mould and the second mould touch each other at respective edges. Then, the edges of the first mould and the second mould may be connected and sealed, wherein the filling body and the other filling body together with the fibers and the phase change material at the predetermined regions are enclosed. Afterwards, resin may be introduced into the sealed mould formed by the first mould portion and the second mould portion. Further, the crosslinking reaction may be initiated by supplying or creating heat from an outside of the mould.

According to an embodiment of the present invention, the method further comprises arranging a filling body, in particular comprising a flexible foam, at the fiber material on the shape forming surface, wherein the phase change material is arranged close to and/or at least partly embedded into the filling body and/or at least partly adhered to the filling body; in particular arranging fiber material at least partly around the filling body.

The filling body may also be referred to as a mandrel which may have been used as such also in conventional manufacturing methods. However, the filling body according to this embodiment of the present invention is prepared to accept the phase change material in the first state and/or the second state at one or more predetermined regions, such that the respective phase change material is (reversibly) connected to the filling body. When the phase change material is somehow attached or connected to the filling body, it may be easier to arrange the phase change material at the predetermined first region and/or the predetermined second region and ensure that the phase change material stays at those predetermined first region and/or predetermined second region and does not shift during any one of the manufacturing steps. The filling body may substantially fill half of an inside space of the rotor blade to be manufactured excluding the space which is required for the resin and the fiber material. The filling body as well as the other filling body (mentioned below) may be covered by a plastic foil or sheet such that also the phase change material arranged close and/or attached to the filling body and/or the other filling body is surrounded by the plastic foil. The filling body may advantageously fill that portion within the rotor blade to be manufactured, which is not intended to be filled with resin.

According to an embodiment of the present invention, the filling body (or a cover plastic sheet) is in contact with an inside portion of fiber material and/or resin forming substantially half of a suction side or a pressure side and/or forming a leading edge or a trailing edge of the rotor blade.

When the filling body is in contact with an inside portion of the fiber material and/or the resin forming only half of a suction side or a pressure side of the wind turbine blade, advantageously, an enforcement structure comprising resin and fiber material may be manufactured and arranged to connect the suction surface inside and the pressure surface inside of the rotor blade. Thereby, the rotor blade may be enforced as required.

According to an embodiment of the present invention, the method further comprises arranging another filling body at the fiber material on the shape forming surface, wherein the phase change material is arranged close to and/or at least partly embedded into the other filling body and/or at least partly adhered to the other filling body; arranging fiber material at least partly around the other filling body.

The filling body and/or the other filling body may be provided by an integrally formed structure or may in other embodiments be provided by several filling body portions. When the filling body and/or the other filling body is provided as an integrally formed structure, it may be simplified to withdraw the filling body and the other filling body from the completed rotor blade, for example from a root end section out of the inside of the manufactured rotor blade.

According to an embodiment of the present invention, the other filling body (or a plastic cover sheet) is in contact with an inside portion of fiber material and/or resin forming substantially half of a pressure side of a suction side and/or forming a trailing edge or a leading edge of the rotor blade, wherein in particular by the filling body and the other filling body and the fiber material and the resin, substantially an entire inside space of the rotor blade is filled.

The filling body and the other filling body are not in direct contact with each other within the rotor blade to be manufactured. The filling body and/or the other filling body may both contain a plane outer surface which may face towards each other within the rotor blade to be manufactured. The plane surfaces may substantially be approximately perpendicular to the suction surface and the pressure surface. In an interface or gap between the two plane surfaces of the filling body and the other filling body, an enforcement structure, also referred to as enforcement web, may be formed comprising one or more precast portions and other portions manufactured by crosslinking the resin embedded into fiber material during the same reaction as when the suction surface and the pressure surface as well as the leading edge and trailing edge are manufactured by crosslinking the resin soaked into the fiber material.

According to an embodiment of the present invention, the method further comprises forming an enforcement web eventually connecting the suction side and the pressure side inside the completed rotor blade by: arranging a precast web portion in a root section between the filling body and the other filling body, arranging fiber material in a central to tip section to be between the filling body and the other filling body, soaking the fiber material in the central to tip section between the filling body and the other filling body with resin and crosslinking.

The enforcement web may, in an inside of the completed rotor blade, connect an inside of the pressure surface with an inside of the suction surface of the rotor blade for strengthening the rotor blade. The precast web portion may be a solid enforcement structure (e.g., laminate) which may have been cured and crosslinked completely. The precast web portion may be placed in the root section between the plane surfaces of the filling body and the other filling body. The fiber material may be placed also onto or between the plane surfaces of the filling body and the other filling body. The fiber material may be placed in any remaining free space between the plane surfaces of the filling body and the other filling body, i.e., not only in the central-to-tip section but also in a root area between the root end of the rotor blade to be connected and the precast web portion.

According to an embodiment of the present invention, the filling body comprises at least one first mounting region, in particular first recess, for receiving and/or mounting phase change material in the first state and/or wherein the filling body comprises at least one second mounting region, in particular second recess, for receiving and/or mounting phase change material in the second state and/or wherein the other filling body comprises at least one other first mounting region, in particular other first recess, for receiving and/or mounting phase change material in the first state and/or wherein the other filling body comprises at least one other second mounting region, in particular other second recess, for receiving and/or mounting phase change material in the second state.

The filling body as well as the other filling body may be provided with the first mounting region and/or the second mounting region, for example by carving out or removing material from the filling body at the respective mounting region. Into the recess, the phase change material may be placed and also affixed or attached. Thereby, one or more different attachment methods and equipment may be utilized, such as rubber band, adhesive tape, adhesive, or by merely covering the recess filled with the phase change material in the respective state using the plastic foil. The respective first and second mounting region may be shaped and/or selected and/or positioned such that, when the filling body and/or the other filling body is placed onto the fiber material on the shape forming surface, the phase change material in the first state is placed in the predetermined first region and the phase change material in the second state is arranged in the predetermined second region which are regions relative to the rotor blade to be manufactured.

According to an embodiment of the present invention, the first mounting region is located at and/or close to at least one of: the fiber material and resin finally forming at least a central portion of the enforcement web; the fiber material and resin finally forming at least a central portion of the pressure side and/or the suction side of the rotor blade.

The first mounting region may for example be close to (a surface of) the respective plane surface portions of the filling body and the other filling body. The space between the plane surface of the filling body and the plane surface of the other filling body may form part of the enforcement web. In this area it is expected that a considerable amount of heat is generated during the crosslinking reaction. Therefore, when the phase change material in the first state is mounted at the first mounting region, this access heat may advantageously be absorbed by the phase change material in the first state. Furthermore, also at the region where resin is present to finally form the pressure side and/or the suction side it is expected that during the crosslinking, excess heat is generated which may advantageously be absorbed by the phase change material in the first state which is arranged in the first mounting region.

According to an embodiment of the present invention, the second mounting region is located, at and/or close to at least one of: a tip side end portion of the precast web portion in a central portion of the blade, in particular extending from a blade inner portion of the suction side to a blade inner portion of the pressure side; a root end of the filling body and/or other filling body.

At the tip side end portion of the precast web portion as well as at the root end of the filling body and the other filling body, it is expected during the crosslinking reaction, that relatively cold are—as are present which would delay the crosslinking reaction, if not the phase change material in the second state would be placed at the second mounting region.

According to an embodiment of the present invention, the first mounting region and/or second mounting region of the filling body and/or the other filling body allows reversibly mounting the phase change material at the respective filling body, in particular using an elastic material, and/or an adhesive tape, wherein the phase change material is contained in at least one pouch, in particular plural pouches.

When the phase change material is reversibly mounted at the filling body and/or the other filling body, after the crosslinking reaction has been finished and the filling body and the other filling body has been removed from the inside of the manufactured rotor blade, the phase change material may advantageously be reused for manufacturing another rotor blade. However, since during the previous crosslinking reaction, the phase change material may have transitioned from the first state to the second state and from the second state to the first state, respectively, before the phase change material is used for another manufacturing of another rotor blade, the phase change material should be set into the state which is required for the particular mounting regions. For example, the phase change material may be swapped from the respective first mounting region to the respective second mounting region and vice versa.

According to an embodiment of the present invention, the method further comprises arranging another shape forming surface, at which fiber material is placed, onto the filling body and/or the other filling body; sealing/connecting an (e.g., circumferential) edge of the shape forming surface with an (e.g., circumferential) edge of the other shape forming surface thereby enclosing the filling body and/or the other filling body and the fiber material on the shape forming surface and on the other shape forming surface and fiber material around the filling body and/or the other filling body; supplying resin to the enclosed fiber material, in particular utilizing vacuum assistance, wherein the other shape forming surface in particular defines a shape of a pressure side or a suction side of the rotor blade; in particular further comprising: heating from outside to initiate and/or accompany the crosslinking reaction of the resin.

Thereby, the method may be characterized by a one shot method in which essentially or substantially the entire rotor blade is manufactured by one single crosslinking reaction and the rotor blade is manufactured using a single mould as formed by connecting the shape forming surface and the other shape forming surface and sealing them.

According to an embodiment of the present invention, during the crosslinking reaction the phase change material at the at least one first region at least partly transitions from the first phase to the second phase, and/or wherein during the crosslinking reaction the phase change material at the at least one second region at least partly transitions from the second phase to the first phase.

Thereby, the phase change material may provide additional heat for the crosslinking reaction where required and may absorb heat at particular regions where heat needs to be absorbed.

According to an embodiment of the present invention, the method further comprises after the crosslinking reaction is completed: removing the filling body and/or the other filling body from the inside of the rotor blade with cured resin from the root portion; unmounting the phase change material at least at one first region and/or at least at one second region from the filling body and/or the other filling body; for manufacturing another rotor blade: mounting phase change material taken from the second region at the first region; and/or mounting phase change material taken from the first region at the second region.

Additionally, or alternatively, the respective phase change materials removed from the first region and/or the second region may additionally be analysed for its respective state and may, depending on the analysis, also be prepared to be in a desired state, before the phase change material is mounted at the respective first mounting region and/or the second mounting region for preparing a next rotor blade.

Embodiments of the present invention allow to improve manufacturing of a wind turbine blade, wherein the rigidity or strength of the rotor blade and the quality of the crosslinked resin and the fiber material may be improved. By introduction of a phase change material (PCM), for example into or at or close to form bodies, in particular mandrels, in critical areas, both extremes, i.e., too cold temperature and too hot temperature, can be compensated during the cross-linking reaction. Excess energy in overheating regions can be absorbed by the PCM. The stored energy can be used to warm areas having too low temperature in producing a next rotor blade by for example swapping the PCM packs from the overheating to the underheating positions.

The phase change material may have the ability to balance temperature extremes or store energy via transition from one phase to another. The most common phase change may be a melting/crystallization transition. Melting is an endothermic phase transition, so it takes up energy and can help to remove excess energy. The reverse solidification and crystallization can release the same amount of energy. A special case is a supercooled liquid which does not spontaneously crystallize under the melting point, but stays liquid until an external trigger starts the crystallization.

The PCM which may be employed in embodiments of the present invention should offer specific properties to fit to the use in the proposed method. In particular, it should be suitable to be placed close to or at or attached to the filling bodies or mandrels. The melting temperature may be for example around 70° C. or within a range from 60° C. to 80° C. The PCM may ideally crystallize in a solvent or diluting agent to form a still flexible and flowable sol (form). For transferring the excess energy from hot spots to cool spots, the PCM ideally may be stable as a supercooled liquid. Candidate materials for the PCM may be purely organic compounds or mixtures thereof like medium chain length, paraffins or organic or inorganic salts, such as sodium acetate.

The PCM packs may be placed in pockets in or at the filling body close to the surface of the filling body (mandrel). These advantageously need to be easily accessible to remove the PCMs after each curing cycle.

In embodiments of the present invention, the PCM is for example provided in packs, and does not need to be connected to an outside and no cables or control is necessary. The process is energy neutral, excess heat is transferred to positions where heat is required by storing the excess heat in the PCM. Compared to other solutions, the complexity is much less and investment cost is minimal.

Using embodiments of the present invention, the cycle time of manufacturing plural wind turbine blades may be reduced to cause sensitive areas of the blade to be cured faster. At the same time, the integrity of the blade can be enhanced and rigidity can be ensured, because overheating and too fast cure can be avoided.

The aspects defined above and further aspects of embodiments of the present invention are apparent from the examples of embodiment to be described hereinafter and are explained with reference to the examples of embodiment. Embodiments of the invention will be described in more detail hereinafter with reference to examples of embodiments but to which the invention is not limited.

BRIEF DESCRIPTION

Figure 2:
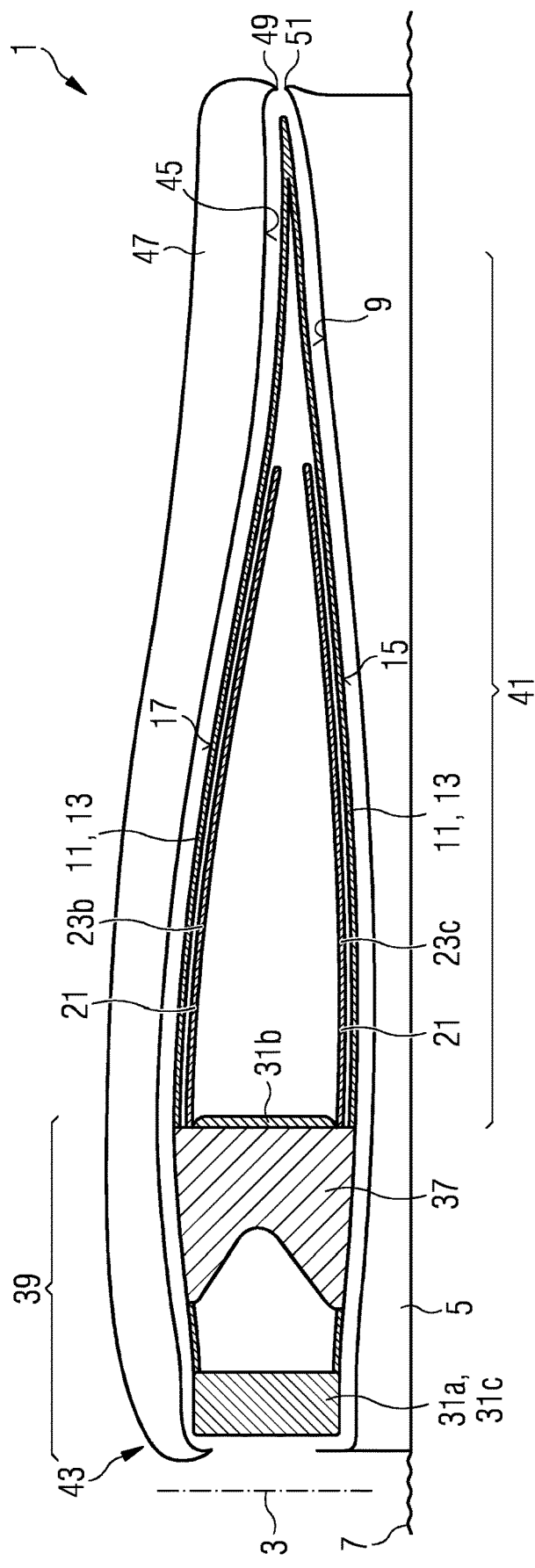
Figure 3:
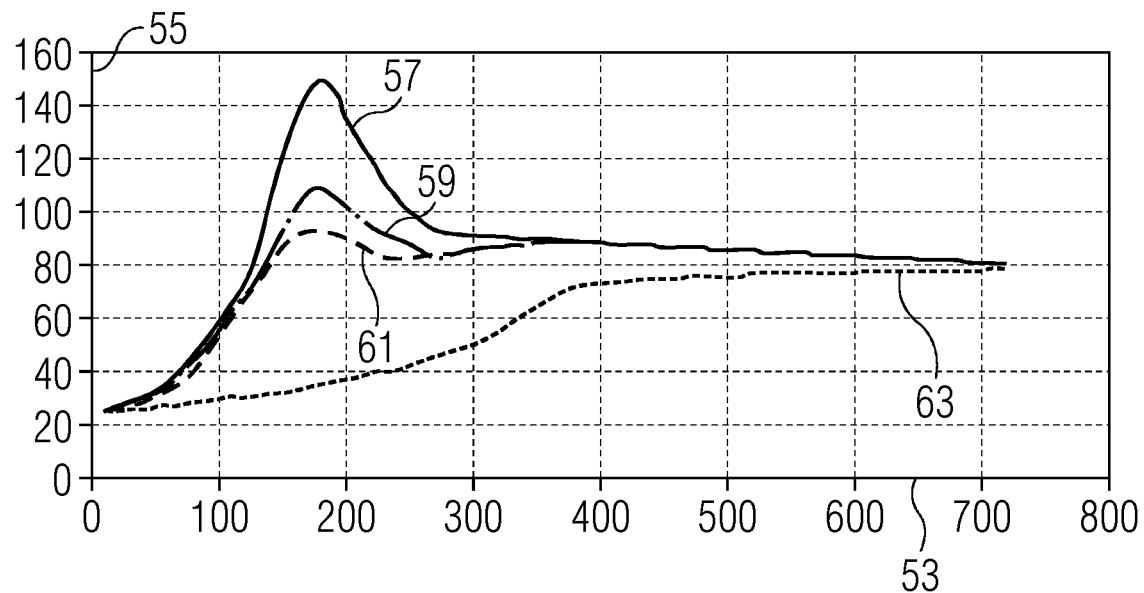
Figure 4:
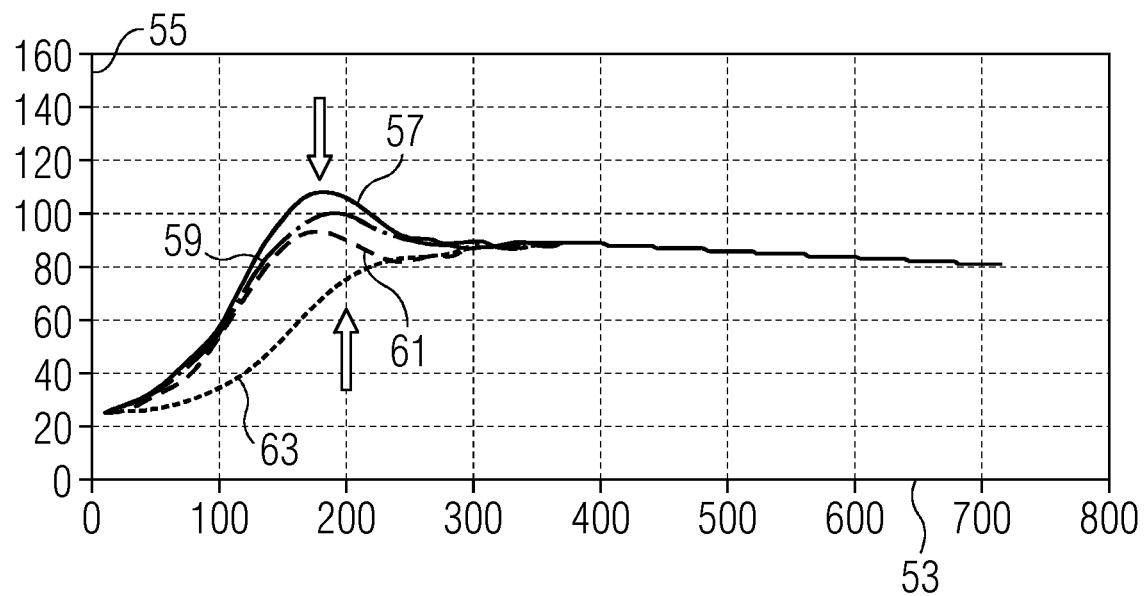

Some of the embodiments will be described in detail, with references to the following Figures, wherein like designations denote like members, wherein:

FIG. 1 schematically illustrates an elevational cross-sectional view of a wind turbine rotor blade during manufacturing according to an embodiment of the present invention;

FIG. 2 schematically illustrates the wind turbine blade illustrated in FIG. 1 in a side cross-sectional view;

FIG. 3 illustrates a first graph showing temperature profiles according to the conventional art and according to embodiments of the present invention; and FIG. 4 illustrates a second graph showing temperature profiles according to the conventional art and according to embodiments of the present invention.

DETAILED DESCRIPTION

The illustration in the drawings is in schematic form. It is noted that in different figures, elements similar or identical in structure and/or function are provided with the same reference signs or with reference signs, which differ only within the first digit. A description of an element not described in one embodiment may be taken from a description of this element with respect to another embodiment.

FIGS. 1 and 2 schematically illustrate a wind turbine rotor blade 1 during manufacturing comprising manufacturing equipment in a cross-sectional elevational view and a side view, respectively. Thereby, the rotation axis 3 around which the completed rotor blade 1 is to be rotated during normal operation is substantially perpendicular to the drawing plane of FIG. 1. FIG. 2 illustrates the wind turbine blade 1 in a cross-sectional side view, wherein the rotation axis 3 is substantially oriented vertically in FIG. 2. As can be seen in FIG. 2, a first mould portion 5 is placed on a ground 7 (or on a support). The first mould portion 5 comprises a shape forming surface 9 which is complementary to or defines a suction surface or a pressure surface of the rotor blade 1 to be manufactured.

The completed rotor blade 1 has a leading edge 14 and a trailing edge 16.

In a first manufacturing step, fiber material 11 is placed onto the shape forming surface 9. In the FIG. 2, this is only schematically illustrated depicting a gap between the shape forming surface 9 and the fiber material 11, for clarity of illustration. In reality, the fiber material 11 is directly placed onto the shape forming surface 9 of the first mould portion 5. Later on during manufacturing, the fiber material 11 will be soaked with resin thereby forming fiber material/resin 13. Later on, this mixture of resin and fiber material 13 will be crosslinked or cured in order to solidify, thereby actually forming the pressure side 15 or the suction side 17 of the rotor blade.

As can be seen in FIG. 1, a filling body 19 has been arranged at the fiber material 11 which had been placed on the shape forming surface 9. The filling body 19 (and another filling body 25) has attached thereto phase change material 21 being in a first state at a predetermined first regions 23a, 23b, 23c, 23d. Phase change material 21 is also placed at the first region 23b as is illustrated in FIG. 2. Also, this PCM 21 in the first state arranged at the first region 23b is adhered or attached to the filling body 19 or to another filling body 25 which is also arranged at the fiber material 11 which had been arranged onto the shape forming surface 9 of the first mould portion 5. For example, the PCM 21 in the first state arranged at the first region 23b is attached to or received in a recess in the first filling body 19 and the other filling body 25 at an outer surface above and below the drawing page of FIG. 1 to be close to the pressure side 15 or the suction side 17 of the rotor blade.

In FIG. 2, the filling body 19 and the other filling body 25 are not illustrated, since FIG. 2 is a cross-sectional view, wherein the cross-section is in a central portion wherein the completed rotor blade, an enforcement web 27 will be formed. For the sake of clarity, the fiber material 11 as well as the fiber material soaked with resin 13 is not illustrated in FIG. 2 in this central section. Thus, the enforcement web 27 illustrated in FIG. 2 in the elevational cross-sectional view is finally also comprising fiber material and resin and will also be solidified during the crosslinking reaction. Thus, the fiber material/resin of the enforcement web as well as the fiber material/resin of the suction side 17 and/or the pressure side 15 will be in contact with the phase change material 21 in the first state at the first predetermined region 23a and 23b.

Furthermore, the method comprises to arrange phase change material 29 at predetermined second regions 31a, 31b, 31c to be also in thermal contact with the fiber material 11 and/or the resin and the fiber material. Also, the PCM 29 in the second state is arranged close to or adhered or attached to the first filling body 19 and/or the other filling body 25. As can be seen in FIGS. 1 and 2, the filling body 19 as well as the other filling body 25 each are in contact with an inside portion of the fiber material and/or the resin forming a half of a suction side 17 or a half of a pressure side 15 of the rotor blade.

The filling body 19 comprises a plane outer surface 33 facing a plane outer surface 35 of the other filling body. Within these plane surfaces 33, 35, a respective recess is provided to enable arranging the PCM in the first state 21 at the first region 23a and 23d, respectively. A similar recess is provided within the filling body 19 at the first region 23b close to the inside portion of the suction side 17. A similar recess is provided within the other filling body 25 at the first region 23c close to the inside portion of the pressure side 15.

Furthermore, the filling body 19 as well as the other filling body 25 comprise recesses to allow attaching the PCM 29 in the second state at the predetermined second region 31a, 31b, 31c.

The method further comprises forming the enforcement web 27 which eventually connects the suction side 17 and the pressure side 15 of the rotor blade in the inside of the completed rotor blade 1. Thereby, a precast web portion 37 is arranged in a root section 39 between the filling body 19 and the other filling body 25. Furthermore, fiber material 11 is arranged in a central-to-tip section 41 to be between the filling body 19 and the other filling body 25. Furthermore, the fiber material 11 in the central-to-tip section 41 is soaked with resin and is crosslinked.

Depending on an analysis or simulation of the crosslinking reaction, one or more first regions or second regions to be filled with the PCM in the first state or the second state may be identified. Respective mounting regions at the filling body 19 and/or the other filling body 25 may be provided. The PCM may be attached to the filling body and/or the other filling body at the respective mounting locations. As can be seen in FIG. 1, the first mounting region 23a is close to the fiber material and resin finally forming at least a central portion of the enforcement web 27. Furthermore, the first region 23b is located at a location finally forming at least a central portion of the pressure side 15 and/or the suction side 17 of the rotor blade.

As can be seen for example in FIG. 1, the second regions 31a, 31c are close to a root end 43 of the filling body 19 and/or the other filling body 25. The second region 31b is at a tip end portion of the precast web portion 37 in a central portion of the blade.

In a next manufacturing step, another shape forming surface 45 of a second mould portion 47 at which also fiber material is placed is arranged onto the filling body 19 and/or the other filling body 25. Then, the edges 49 and 51 of the shape forming surface 9 and the other shape forming surface 45 are connected and sealed in a circumferential manner to enclose the filling body 19 and/or the other filling body 25 and the fiber material 11 and the resin. Then, resin is supplied into the space enclosed by the shape forming surface 9 and the other shape forming surface 45 which is not occupied by the filling bodies 19 and 25.

Further, the method comprises to heat the resin from outside the mould formed by the moulding portions 5 and 47. In FIGS. 1 and 2, one or more inflow ports for introducing the resin and one or more outflow ports are not illustrated. Also heating equipment is not illustrated in detail. By heating the crosslinking reaction may be initiated. During the crosslinking reaction, phase change material at the first region 23a, 23b, 23c, 23d may transition from the first phase into the second phase and/or the phase change material at the second region 31a, 31b, 31c may transition from the second state to the first state, at least partly.

After having completed the crosslinking reaction, the filling body 19 and the other filling body 25 may be removed from the inside of the rotor blade, in particular withdrawn from the root end section 43. The phase change material 21 at the first mounting regions 23a, 23b, 23c, 23d may be removed and also the phase change material 29 originally in the second state may be removed or unmounted from the filling body 19 and the other filling body 25. The respective phase change material 21, 29 may be checked for its state after having completed the crosslinking reaction. For manufacturing a next rotor blade, the respective phase change material may be prepared to be in a defined first state or a defined second state and may be mounted at the first region and the second region respectively. Ideally, it may be possible to simply swap several of the originally first state PCM and the originally second state PCM and mount it at the filling body and/or the other filling body 19, 25.

The precast web 37 may comprise a cured epoxy laminate for example. The filling body 19, 25 may comprise a flexible foam or resilient foam.

FIGS. 3 and 4 illustrate graphs showing temperature profiles during manufacturing according to a conventional method (FIG. 3) and according to embodiments of the present invention (FIG. 4).

Therein, an abscissa 53 indicates the time, while an ordinate 55 indicates the temperature. The curve 57 illustrates the temperature profile of a hot spot. The curve 59 illustrates the temperature profile of a thick laminate, the curve 61 illustrates the temperature profile of a thin laminate and the curve 63 illustrates the temperature profile of a pre-casted part overlap.

As can be taken from FIG. 4 compared to FIG. 3, the temperature of the hot spot is considerably decreased when using the phase change material at the respective hot spot regions, for example regions 23a, 23b illustrated in FIGS. 1 and 2. Furthermore, the pre-casted part overlap illustrated as curve 63 has increased temperature when the phase change material is placed at the second region, for example the second regions 31a, 31b, 31c.

Therefore, the temperature is reduced in hot spot regions and is increased in cold spot regions, thereby enhancing the crosslinking reaction while not overheating so avoiding damaging of equipment such as the filling bodies.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of manufacturing a rotor blade of a wind turbine, the method comprising:
   placing fiber material on a shape forming surface;
   arranging phase change material being in a first state at at least one predetermined first region and arranging phase change material being in a second state at at least one predetermined second region;
   soaking the fiber material with resin to be in thermal contact with the phase change material at the first region and the second region;
   during a crosslinking reaction for crosslinking the resin:
   absorbing heat generated within the resin by the phase change material at the first region; and
   releasing heat from the phase change material toward the resin at the second region.

2. The method according to claim 1, wherein the first state allows absorbing heat and comprises a crystalline phase, or a first crystal phase of the phase change material, wherein the second state allows releasing heat and comprises a liquid phase or a second crystal phase of the phase change material.

3. The method according to claim 1, wherein the shape forming surface is provided by a first mould and defines a shape of a suction side or a pressure side of the rotor blade.

4. The method according to claim 1, further comprising:
   arranging a filling body at the fiber material on the shape forming surface, wherein the phase change material is arranged close to and/or at least partly embedded into the filling body and/or at least partly adhered to the filling body;
   wherein the fiber material is arranged at least partly around the filling body.

5. The method according to claim 4, wherein the filling body is in contact with an inside portion of fiber material and/or resin forming substantially half of a suction side or a pressure side and/or forming a leading edge or a trailing edge of the rotor blade.

6. The method according to claim 1, further comprising:
   arranging another filling body at the fiber material on the shape forming surface, wherein the phase change material is arranged close to and/or at least partly embedded into the other filling body and/or at least partly adhered to the other filling body;
   wherein the fiber material is arranged at least partly around the other filling body.

7. The method according to claim 6, wherein the other filling body is in contact with an inside portion of fiber material and/or resin forming substantially half of a pressure side or a suction side and/or forming a trailing edge or a leading edge of the rotor blade, wherein in particular by the filling body and the other filling body and the fiber material and the resin, substantially an entire inside space of the rotor blade is filled.

8. The method according to claim 1, further comprising forming an enforcement web connecting the suction side and the pressure side inside a completed rotor blade by:
   arranging a precast web portion in a root section between a filling body and an other filling body;
   arranging fiber material in a central to tip section to be between the filling body and the other filling body, and
   soaking the fiber material in the central to tip section between the filling body and the other filling body with resin and crosslinking.

9. The method according to claim 4, wherein the filling body comprises at least one first mounting region for mounting phase change material in the first state and/or wherein the filling body comprises at least one second mounting region, for mounting phase change material in the second state and/or wherein an other filling body comprises at least one other first mounting region for mounting phase change material in the first state and/or wherein the other filling body comprises at least one other second mounting region for mounting phase change material in the second state.

10. The method according to claim 9, wherein the first mounting region is located at and/or close to at least one of:
    the fiber material and resin finally forming at least a central portion of the enforcement web;
    the fiber material and resin finally forming at least a central portion of the pressure side and/or the suction side of the rotor blade.

11. The method according to claim 9, wherein the second mounting region is located, at and/or close to at least one of:
    a tip side end portion of the precast web portion in a central portion of the blade extending from a blade inner portion of the suction side to a blade inner portion of the pressure side; and
    a root end of the filling body and/or other filling body.

12. The method according to claim 9, wherein the first mounting region and/or second mounting region of the filling body and/or the other filling body allows reversibly mounting the phase change material at the respective filling body using an elastic material, and/or an adhesive tape, wherein the phase change material is contained in at least one pouch.

13. The method according to claim 1, further comprising:
    arranging another shape forming surface, at which fiber material is placed, onto a filling body and/or an other filling body;
    connecting an edge of the shape forming surface with an edge of the other shape forming surface) thereby enclosing the filling body and/or the other filling body and the fiber material on the shape forming surface and on the other shape forming surface and/or fiber material around the filling body and/or the other filling body;
    supplying resin to the enclosed fiber material utilizing vacuum assistance, wherein the other shape forming surface defines a shape of a pressure side or a suction side of the rotor blade; and
    heating from outside to initiate and/or accompany the crosslinking reaction of the resin.

14. The method according to claim 1, wherein during the crosslinking reaction the phase change material at the at least one first region at least partly transitions from the first phase to the second phase, and/or wherein during the crosslinking reaction the phase change material at the at least one second region at least partly transitions from the second phase to the first phase.

15. The method according to claim 1, further comprising, after the crosslinking reaction is completed:
    removing a filling body and/or an other filling body from the inside of the rotor blade with cured resin from the root portion;
    unmounting the phase change material at least at one first region and/or at least at one second region from the filling body and/or the other filling body;
    for manufacturing another rotor blade:

mounting phase change material taken from the second region at the first region; and/or mounting phase change material taken from the first region at the second region.

* * * * *